(12) United States Patent
Joseph et al.

(10) Patent No.: US 10,860,742 B2
(45) Date of Patent: Dec. 8, 2020

(54) PRIVACY RISK INFORMATION DISPLAY

(71) Applicant: ENTIT SOFTWARE LLC, Sanford, NC (US)

(72) Inventors: Gabi Bar Joseph, Yehud (IL); Tomer Gershoni, Yehud (IL); Yaniv Toledano, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 242 days.

(21) Appl. No.: 16/061,547

(22) PCT Filed: Dec. 22, 2015

(86) PCT No.: PCT/US2015/067519
§ 371 (c)(1),
(2) Date: Jun. 12, 2018

(87) PCT Pub. No.: WO2017/111967
PCT Pub. Date: Jun. 29, 2017

(65) Prior Publication Data
US 2020/0134227 A1 Apr. 30, 2020

(51) Int. Cl.
*G06F 21/62* (2013.01)
*G09G 5/00* (2006.01)

(52) U.S. Cl.
CPC ......... *G06F 21/6245* (2013.01); *G09G 5/003* (2013.01); *G09G 2340/14* (2013.01); *G09G 2354/00* (2013.01); *G09G 2358/00* (2013.01)

(58) Field of Classification Search
CPC .............. G06F 21/6245; G09G 5/003; G09G 2340/14; G09G 2354/00; G09G 2358/00

USPC ........................................................ 726/26
See application file for complete search history.

(56) References Cited

U.S. PATENT DOCUMENTS

| | | | |
|---|---|---|---|
| 7,234,065 B2 | 6/2007 | Breslin et al. | |
| 8,370,193 B2 | 2/2013 | Saraf | |
| 8,561,185 B1 * | 10/2013 | Muthusrinivasan | G06F 21/6245 705/51 |
| 8,621,645 B1 * | 12/2013 | Spackman | G06F 21/84 726/26 |
| 8,925,099 B1 | 12/2014 | Save et al. | |
| 2004/0230835 A1 | 11/2004 | Goldfeder | |
| 2012/0110674 A1 * | 5/2012 | Belani | H04W 4/60 726/25 |

(Continued)

OTHER PUBLICATIONS

International Searching Authority., International Search Report and Written Opinion dated Aug. 24, 2016 for PCT Application No. PCT/US2015/067519 Filed Dec. 22, 2015, 13 pages.

(Continued)

*Primary Examiner* — Michael S McNally

(57) ABSTRACT

Example implementations are described that include displaying a graphical element related to privacy risk information for an application. A processor of a computing device may determine, for the application, a privacy attention score based on first privacy risk information. The processor may determine, for the application, an aggregated privacy assessment score from a plurality of privacy risk scores that are based on second privacy risk information. The processor may cause a graphical element representing a combination of the privacy attention score and the aggregated privacy assessment score to be displayed via a display device.

20 Claims, 7 Drawing Sheets

(56) References Cited

U.S. PATENT DOCUMENTS

2012/0284297 A1* 11/2012 Aguera-Arcas ..... G06F 3/03547
 707/769
2014/0082738 A1 3/2014 Bahl
2014/0137257 A1 5/2014 Martinez et al.
2014/0289859 A1 9/2014 Archer

OTHER PUBLICATIONS

Minkus, T., et al., On a Scale from 1 to 10, How Private Are You? Scoring Facebook Privacy Settings, Feb. 23, 2014, USEC '14, Internet Society, 6 pages.

* cited by examiner

PRIVACY RISK INFORMATION DISPLAY

BACKGROUND

Some applications may exchange private information over a network, such as the internet. When private information is exchanged, there may be a risk that the information is seen or otherwise accessed by unauthorized individuals or entities. Managing application privacy risks, such as during development of applications, may prove challenging.

DETAILED DESCRIPTION

Figure 1:
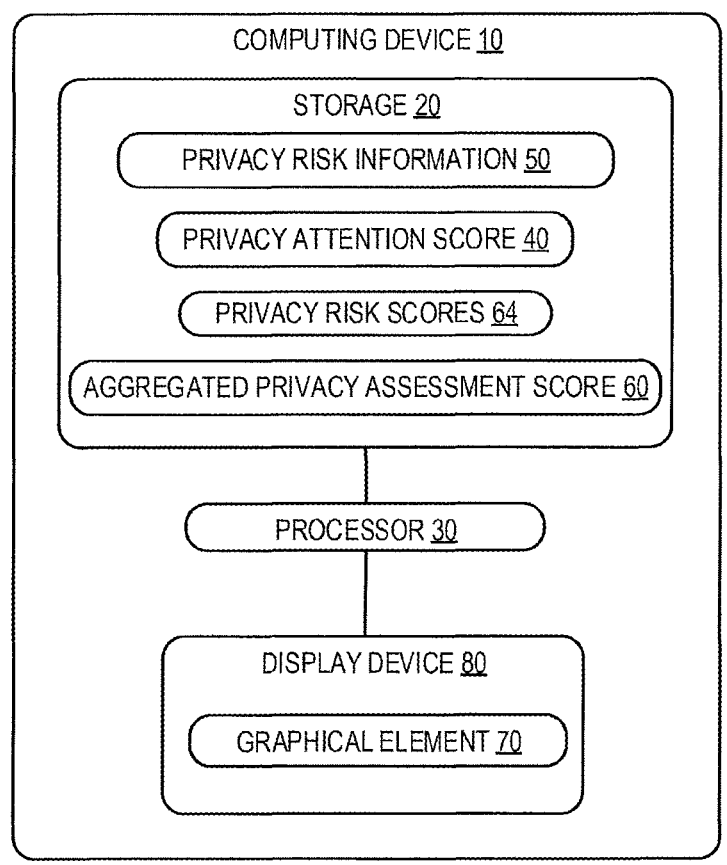
FIG. 1 is a block diagram of an example computing device for displaying privacy risk combinations consistent with examples of the present disclosure.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As noted above, some applications may exchange private information over a network, such as the Internet. Such private information may include personally identifiable information, such as information that can be used to distinguish or trace an individual's identity, either alone or when combined with other personal or identifying information. The other personal or identifying information may be linked or linkable to a specific individual (e.g., name, social security number, biometric records, date and place of birth, mother's maiden name, and the like).

When private information is exchanged, there may be a risk (e.g., a privacy risk) that the private information is seen or otherwise accessed by those who are not authorized to do so. As this exchange of private information may be regulated by legislation, privacy risks may need to be identified during application development. Traditional methods of identifying these risks may have included high-level reviews, such as non-developers taking a high-level look at a product in which the application is utilized, as opposed to examining actual application code. However, this approach may not have resulted in accurate identification and/or assessment of each of the privacy risks in the application. Additionally, different organizations may have different commitments and/or obligations to different privacy regulations that may impact the organization's applications and other software products.

Some organizations may have numerous applications and software products under development. The applications also may be at various stages in a software development lifecycle. In such multi-asset environments where different organizations also may have different privacy commitments/obligations, it can prove challenging to capture accurate privacy risk information and communicate such information in a comprehensive and easily-digestible manner to decision makers.

Examples disclosed herein may provide and display privacy risk determinations. To this end and as described in more detail below, examples may utilize privacy risk information to determine privacy attention scores and aggregated privacy assessment scores, and may cause a graphical element representing a combination of a privacy attention score and an aggregated privacy assessment score to be displayed via a display device.

FIG. 1 is a block diagram of an example computing device 10 for performing and displaying privacy risk determinations for applications. For example, computing device 10 may be a server, a desktop computer, a laptop computer, smart phone, and/or any other suitable type of computing device. Computing device 10 may perform various functions consistent with disclosed examples. In some implementations and as described in more detail below, computing device 10 may process privacy risk information to determine, for an application, a privacy attention score and an aggregated privacy assessment score. A graphical element representing a combination of the privacy attention score and the aggregated privacy assessment score may be displayed via a display device. Examples of computing device 10 and certain functions that may be performed by computing device 10 are described in greater detail below with respect to, for example, FIGS. 2-7.

In the example shown in FIG. 1, computing device 10 may include a storage 20 and a processor 30. The processor 30 may execute instructions for performing and displaying privacy risk determinations for applications. For example and as described in more detail below, the processor 30 may determine, for an application, a privacy attention score 40 based on a portion of privacy risk information 50. The processor 30 also may determine, for the application, an aggregated privacy assessment score 60 from a plurality of privacy risk scores 64 that are based on another portion of the privacy risk information 50. The processor 30 may cause a graphical element 70 representing a combination of the privacy attention score and the aggregated privacy assessment score to be displayed via display device 80.

The processor 30 may include at least one physical device configured to execute at least one instruction. In some examples the processor 30 may comprise a plurality of processors. The processor 30 may be configured to execute instructions that are stored on a non-transitory machine-readable storage medium. Such instructions may be part of at least one application, agent, module, service, program, routine, library, object, component, data structure, or other logical construct. Such instructions may be implemented to perform methods and functions described herein, or to perform a task, implement a data type, transform the state of at least one device, or otherwise arrive at a desired result consistent with the examples disclosed herein.

Storage 20 may store instructions executable by the processor 30. In some examples storage 20 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 20 may include memory devices with at least one of the following characteristics: volatile, nonvolatile, dynamic, static, read/write, read-only, random access, sequential access, location addressable, file addressable, and content addressable. In some examples, the storage 20, processor 30 and display device 80 may be components of at least one computing device, such as computing device 10.

Computing device 10 may be implemented in a number of different configurations without departing from the scope of the disclosed examples. In some examples, computing device 10 may comprise a privacy assessment device that may be communicatively coupled to a separate display device. For example and with reference now to FIG. 2, a block diagram showing an example system 200 for performing and displaying privacy risk determinations for applications consistent with examples of the present disclosure is provided. In this example, system 200 may include a privacy assessment device 210, a client device 220, a storage device 230, and a network 240 for communicatively coupling privacy assessment device 210 with client device 220 and/or storage device 230.

Privacy risk assessment device 210 may be a computing system that performs various functions consistent with disclosed examples. For example, privacy risk assessment device 210 may take the form of computing device 10, a server, a desktop computer, a laptop computer, and/or any other suitable type of computing device. In some examples, privacy risk assessment device 210 may process information received from client device 220 and/or storage device 230. For example, privacy risk assessment device 210 may receive first privacy risk information 244 related to a plurality of applications 248, and may determine, based on the first privacy risk information, a privacy attention score 252 for each of the applications. Additional descriptions of privacy attention score 252 are provided below. The privacy risk assessment device 210 also may determine, for each of the applications 248, an aggregated privacy assessment score 256 from a plurality of privacy risk scores 260 that are based on second privacy risk information 264. Additional descriptions of aggregated privacy assessment score 256 are provided below. The privacy risk assessment device 210 may cause a graphical element representing a combination of the privacy attention score 252 and the aggregated privacy assessment score 256 to be displayed via a display device, such as display 224 of client device 220. Examples of privacy risk assessment device 210 and certain functions that may be performed by device 210 are described in greater detail below with respect to, for example, FIGS. 2-7.

Client device 220 may be a computing system operated by a user. For example, client device 220 may be a desktop computer, a laptop computer, a tablet computing device, a mobile phone, and/or any other suitable type of computing device. In some examples, client device 220 may be a computing device to perform operations consistent with certain disclosed implementations. For example and as described in more detail below, client device 220 may transmit privacy risk information, such as privacy attention questionnaire responses, privacy assessment questionnaire responses, and/or other information related to privacy risks to privacy risk assessment device 210.

Client device 220 may include a processor 226 to execute instructions stored in a machine-readable storage medium. In the example shown in FIG. 2, client device 220 may include a processor 226, a machine-readable storage medium 228, display device 224, and an interface 234. Processor 226 of client device 220 may be at least one processing unit (CPU), microprocessor, and/or another hardware device to execute instructions to perform operations. For example, processor 220 may fetch, decode, and execute instructions stored in machine-readable storage medium 228 (such as privacy risk information capture instructions 238) to capture privacy risk information entered in response to identifying a privacy risk and/or in response to a privacy questionnaire.

Machine-readable storage medium 228 may be any electronic, magnetic, optical, or other non-transitory storage device that stores instructions executed by processor 226. Display 224 may be any type of display device that presents information, such as via a user interface that captures privacy risk information, from client device 220. Interface 234 may be any combination of hardware and/or programming that facilitates the exchange of data between the internal components of client device 220 and external components, such as privacy risk assessment device 210. In some examples, interface 234 may include a network interface device that allows client device 220 to receive and send data to and from various components, such as to and from privacy risk assessment device 110, via network 240.

Storage device 230 may be any type of storage system configuration that facilitates the storage of data. For example, storage device 230 may facilitate the locating, accessing, retrieving, and/or obtaining of data related to privacy risks that are identified and/or received by privacy risk assessment device 210, such as privacy attention scores 252 and/or aggregated privacy assessment scores 256 that may be assigned to each of various applications based on an analysis of privacy risk information 244, 264. Storage device 230 can be populated by a number of methods. For example, privacy risk assessment device 210 may populate storage device 230 by receiving, accessing, and/or otherwise obtaining data related to privacy attention scores and privacy risk scores assigned by privacy risk assessment device. In some examples this data may include information indicating a type of graphical element representing a combination of a privacy attention score and an aggregated privacy assessment score for an application to be displayed, information related to displaying a privacy profile that comprises a plurality of such graphical elements, information indicating which portions of code correspond to a privacy risk, a type of indicator that may be displayed on the portions of code, and/or any other suitable information.

Figure 2:
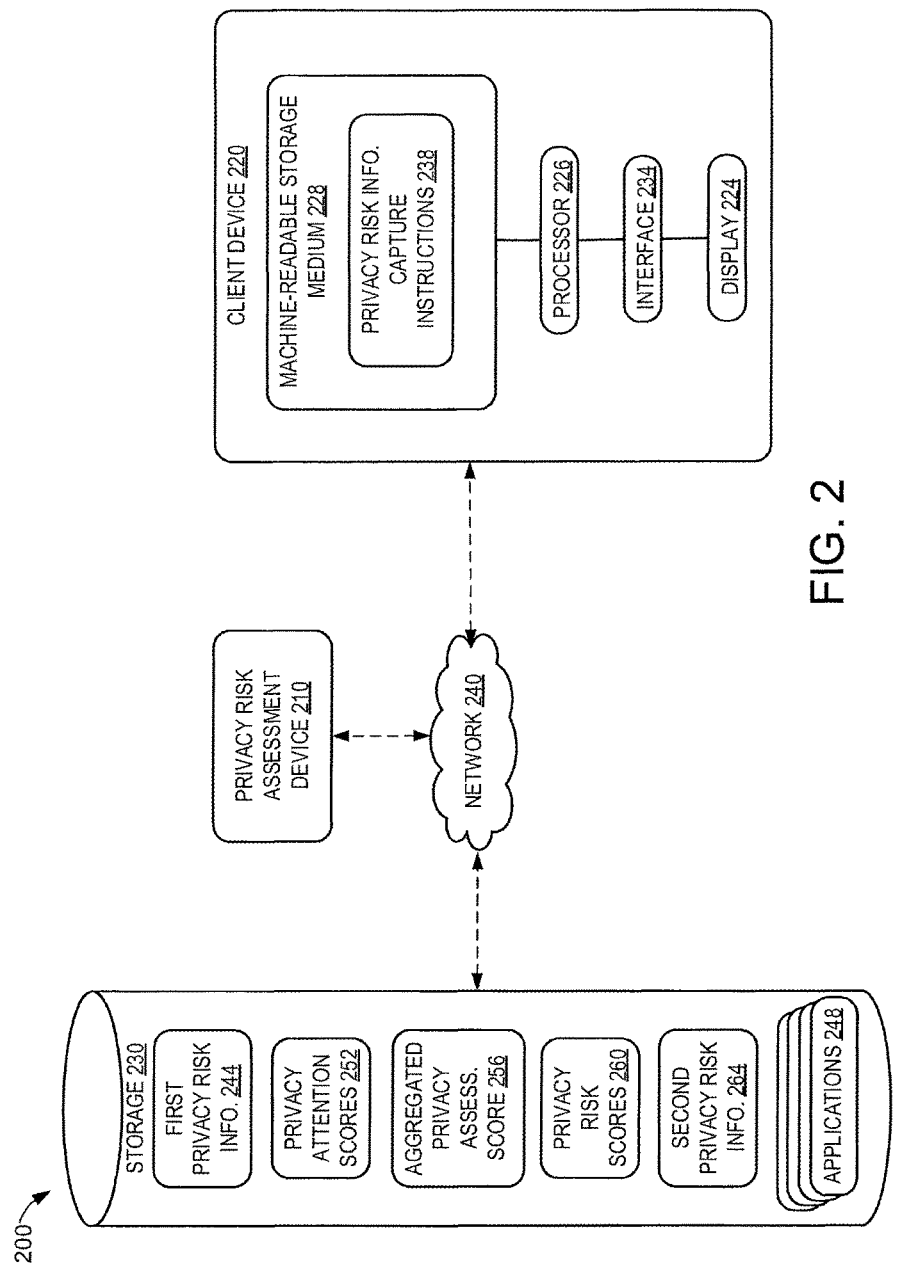
FIG. 2 is a block diagram illustrating an example system for displaying privacy risk combinations consistent with examples of the present disclosure.

While in the example shown in FIG. 2 storage device 230 is a single component external to components 210 and 220, storage device 230 may comprise separate components and/or may be part of devices 210, 220, and/or another device. In some implementations, storage device 230 may be managed by components of privacy risk assessment device 210 and/or other devices capable of accessing, creating, controlling and/or otherwise managing data remotely via network 240.

Network 140 may be any type of network that facilitates communication between remote components, such as privacy risk assessment device 210 and client device 220. For example, network 240 may be a local area network (LAN), a wide area network (WAN), a virtual private network, a dedicated intranet, the Internet, and/or a wireless network.

The arrangement illustrated in FIG. 2 is simply an example, and system 200 may be implemented in a number of different configurations. For example, while FIG. 2 shows one privacy risk assessment device 210, client device 220, storage device 230, and network 240, system 200 may include any number of components 210, 220, 230, and 240, as well as other components not depicted in FIG. 2. For example, system 200 may omit any of components 210, 220, 230, and 240, and/or the functionality of at least one of components 210, 220, 230, and 240 may be incorporated into another component (e.g., components 210, 220, 230, 240, and/or a component not shown in FIG. 2).

Figure 3:
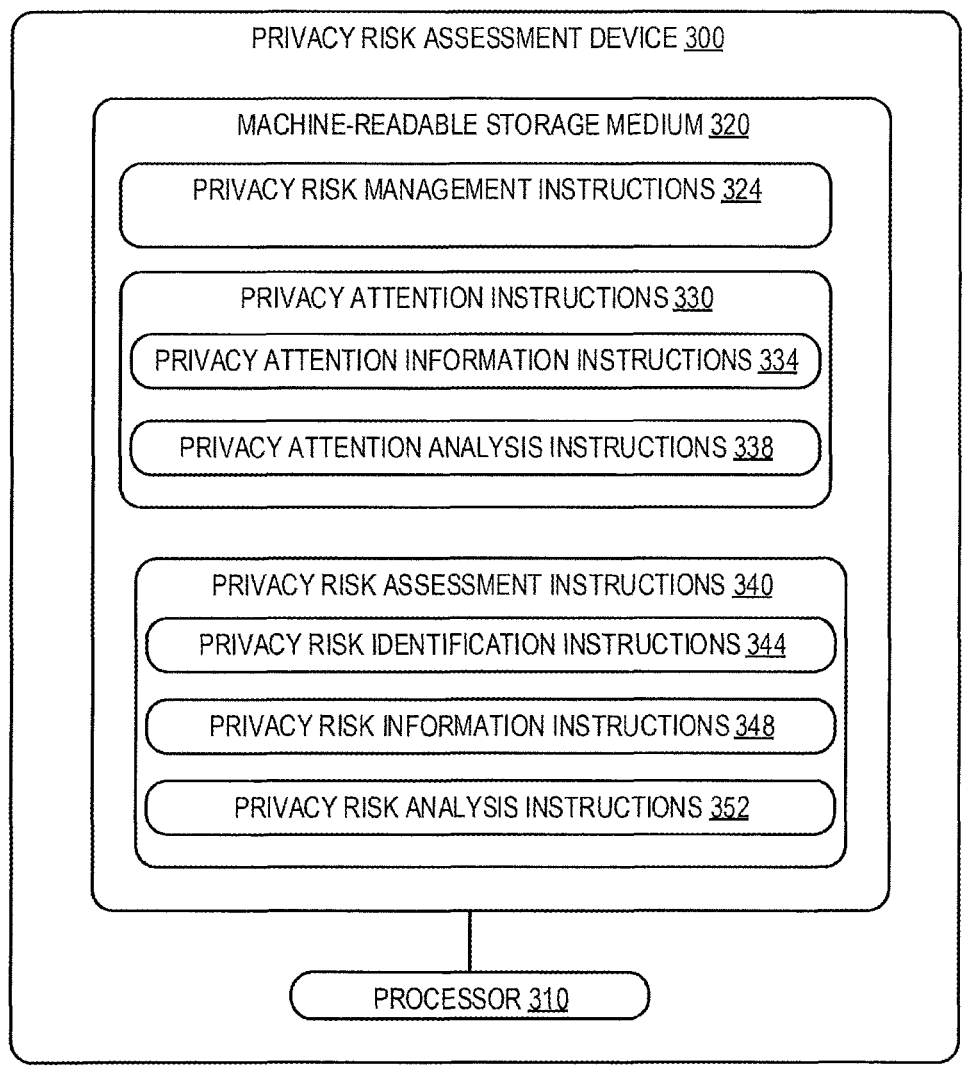
FIG. 3 is an illustration of an example privacy risk assessment device for assessing privacy risks consistent with examples of the present disclosure.

FIG. 3 is a block diagram of an example privacy risk assessment device 300 consistent with disclosed implementations. In certain aspects, privacy risk assessment device 300 may correspond to privacy risk assessment device 210 of FIG. 2. Privacy risk assessment device 300 may be implemented in various ways. For example, device 300 may be a special purpose computer, a server, a mainframe computer, and/or any other suitable type of computing device. In the example shown in FIG. 3, privacy risk assessment device 300 may include a processor 310 and a machine-readable storage medium 320. Processor 310 may be at least one processing unit (CPU), microprocessor, and/or another hardware device to execute instructions to perform operations. For example, processor 310 may fetch, decode, and execute privacy risk management instructions 324, privacy attention instructions 330 (e.g., instructions 334 and/or 338) and/or privacy risk assessment instructions 340 (e.g., instructions 344, 348 and/or 352) stored in machine-readable storage medium 320 to perform operations consistent with disclosed examples.

Machine-readable storage medium 320 may be any electronic, magnetic, optical, and/or other physical storage device that stores executable instructions. Thus, machine-readable storage medium 320 may be, for example, memory, a storage drive, an optical disc, and the like. In some implementations, machine-readable storage medium 320 may be a non-transitory machine-readable storage medium, where the term "non-transitory" does not encompass transitory propagating signals. Machine-readable storage medium 320 may be encoded with instructions that, when executed by processor 310, perform operations consistent with disclosed implementations.

For example, machine-readable storage medium 320 may include instructions that perform operations to receive first privacy risk information related to a plurality of applications; determine, based on the first privacy risk information, a privacy attention score for each of the applications; determine, for each of the applications, an aggregated privacy assessment score from a plurality of privacy risk scores that are based on second privacy risk information; and display via a display device a privacy profile that comprises, for each of the applications, a graphical element representing a combination of the privacy attention score and the aggregated privacy assessment score for the application.

As described in more detail below, privacy risk management instructions 324 may function to combine a privacy attention score with an aggregated privacy assessment score for an application into a combination privacy risk score. In some implementations, when privacy risk management instructions 324 are executed by processor 310 and/or another processor, privacy risk management instructions 324 may determine combination privacy risk scores for a plurality of applications, and may display via a display device a privacy profile that comprises graphical elements corresponding to each of the applications, wherein a location in the privacy profile of each of the graphical elements indicates the combination privacy risk score for the corresponding application.

Privacy attention information instructions 334 may function to obtain privacy risk information related to a level of privacy attention to be afforded to an application. In some examples, developers and/or other decision makers may be managing numerous applications that are awaiting the start of development, actively under development, or released to market. The privacy risks associated with the various applications may differ in nature and/or severity. Accordingly, it may be challenging to prioritize the attention of developers/decision makers and other resources with respect to the various applications and their corresponding privacy risks.

In some implementations, when privacy attention information instructions 334 are executed by processor 310 and/or another processor, privacy attention information instructions may cause the generation of a privacy attention questionnaire and may receive a response to the privacy attention questionnaire, where the response includes privacy risk information. For example, privacy attention information instructions 334, when executed, may cause the generation of a privacy attention questionnaire, cause the display of the privacy attention questionnaire on a display device, such as display 224 of client device 220, cause the capturing of responses to the privacy attention questionnaire, and cause the transmitting of the responses to another device, such as privacy risk assessment device 300.

In some implementations, the privacy attention questionnaire may include questions relating to a number of different aspects of an application, such as questions relating to at least one of personal information acquisition by the application (e.g., does the application control, hold, transfer, monitor, and/or track, directly or indirectly, personal information), sensitivity level of personal information acquired by the application (e.g., does or may the product, when in usage by customers, store personal information that is considered particularly sensitive, such as health records, financial records, criminal records, and/or children's records), application usage of privacy-risking technology (e.g., usage of technologies that may risk users' privacy, such as head-mounted display devices, collection of biometric information, facial recognition technology, connectivity to mobile devices, and location tracking functionality), application revenue (e.g., revenues expected from application and/or associated product sales/licensing), and application interfaces (e.g., whether the application includes mobile capabilities).

The privacy risk information may include information responsive to the questions on the privacy attention questionnaire, such as personal information acquisition information by the application (e.g., information responsive to questions related to personal information acquisition by the application), sensitivity level information (e.g., information responsive to questions related to the sensitivity level(s) of personal information acquired by the application), privacy-risking technology information (e.g., information responsive to questions related to application usage of privacy-risking technology), application revenue information (e.g., information responsive to questions related to expected revenues to be generated from the application), and application interface information (e.g., information responsive to questions related mobile capabilities of the application). In some implementations, the foregoing privacy risk information related to responses from the privacy attention questionnaire may comprise first privacy risk information.

In some implementations, the privacy attention questionnaire may include a number of pre-populated questions and pre-populated responses from which a user may select (e.g., via radio button, drop down menu, checkbox, etc.) to provide first privacy risk information to privacy risk assessment device 300. Thus, in some implementations, the privacy attention questionnaire may include two or more selectable pre-populated responses to a question (e.g., Yes or No, $100M≤Expected Revenue≤$200M, etc.) along with a numerical value associated with each selectable response (e.g., 0, 5, 8, 26, etc.) and/or any other suitable information. In some examples, each numerical value assigned to each pre-populated response may be a weighting value that corresponds to a risk level. In some implementations, responses to questions that demonstrate a greater likelihood of risk impact may be assigned larger numerical values. For example, if the response to a selected question indicates a privacy risk that may result in high reputational damage, such response may be assigned a higher weighting value (e.g., "26") than another response to a different question that indicates a privacy risk that may result in moderate reputational damage (e.g., "8"). In some implementations, each weighting value may correspond to a projected impact to the application and/or its related business/organization by virtue of a potential privacy breach.

In some implementations the privacy attention analysis instructions 338 may function to determine a privacy attention score 252 for the application based on the first privacy risk information. For example, the foregoing weighting values may be used to determine the privacy attention score 252. In some examples, the weighting values corresponding to each user-selected response in the privacy attention questionnaire may be summed to generate the privacy attention score 252. The score may be compared to two or more privacy attention ranges to assign a privacy attention level to the application. In other words, an application may be categorized based on its privacy attention score 252 falling within one of two or more privacy attention ranges.

For example, an overall distribution of privacy attention scores may be defined between 0 and 100. In one implementation, a first privacy attention range may be defined as a privacy attention score ≤10. If the privacy attention score is less than or equal to 10, the privacy attention level for the corresponding application may be categorized as "None." A privacy attention level of "None" for an application may correspond to a privacy vulnerability of "Very low risk" for the application. A second privacy attention range may be defined as 10<privacy attention scores ≤30. If the privacy attention score falls within this second range, the privacy attention level for the corresponding application may be categorized as "Low." A privacy attention level of "Low" for an application may correspond to a privacy vulnerability of "Low risk" for the application.

A third privacy attention range may be defined as 30<privacy attention score ≤55. If the privacy attention score falls within this third range, the privacy attention level for the corresponding application may be categorized as "Medium." A privacy attention level of "Medium" for an application may correspond to a privacy vulnerability of "High risk" for the application. A fourth privacy attention range may be defined as a privacy attention score >55. If the privacy attention score falls within this fourth range, the privacy attention level for the corresponding application may be categorized as "HIGH." A privacy attention level of "HIGH" for an application may correspond to a privacy vulnerability of "Urgent risk" for the application. While in this example particular ranges are identified as corresponding to "None," "Low", "Medium," and "High," and particular privacy vulnerability categories are identified as corresponding to "Very low risk," "Low risk," "High risk," and "Urgent risk," various other ranges and/or categories, as well as a fewer or greater number of ranges and/or categories, may be utilized consistent with the disclosure.

In some implementations, privacy attention analysis instructions 338 may function to assign a proposed action to each privacy attention level. For example, a privacy attention level of "None" for an application may be assigned a proposed action of "Continue development/Follow up privacy analysis at milestone X." A privacy attention level of "Low" may be assigned a proposed action of "Execute Privacy Impact Analysis without affecting development process." A privacy attention level of "Medium" may be assigned a proposed action of "Execute Privacy Impact Analysis and mitigate/Active approval needed for launch." A privacy attention level of "HIGH" may be assigned a proposed action of "Execute Privacy Impact Analysis and mitigate/Active approval needed for launch."

Figure 4:
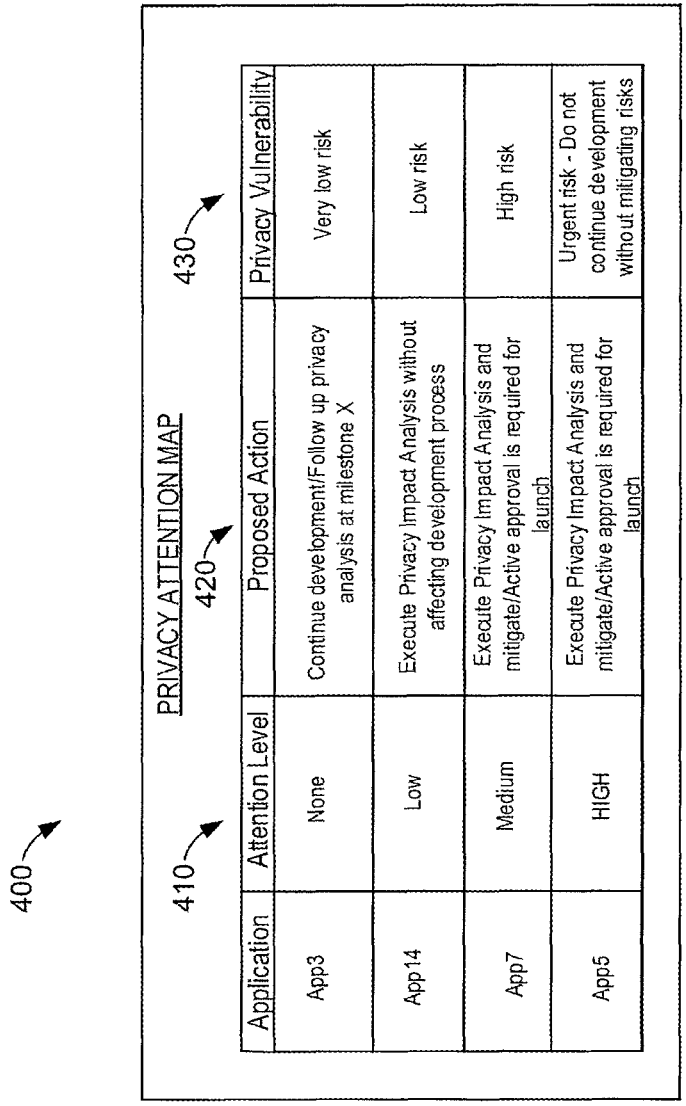
FIG. 4 is an illustration of an example privacy attention map consistent with examples of the present disclosure.

With reference now to FIG. 4 and in some implementations, based on categorizing each of the applications using its privacy attention score, privacy attention analysis instructions 338 may generate a privacy attention map 400. In examples, the privacy attention map 400 may comprise, for each of the applications, a privacy attention level identifier 410 that corresponds to a privacy attention level as described above, a proposed action 420, and a privacy vulnerability identifier 430 that corresponds to the privacy vulnerability categories as described above. Each of the privacy attention level identifier 410, proposed action 420, and privacy vulnerability identifier 430 are based on the privacy attention score of the application.

The privacy attention level identifier 410 may comprise text, graphics, a combination of text and graphics, and/or any other information capable of indicating a particular privacy attention level. In the example of FIG. 4, the privacy attention map 400 includes four privacy attention level identifiers 410: "None," "Low," "Medium," and "HIGH." In some implementations, privacy attention analysis instructions 338, when executed by a processor, may assign a semitransparent purple block to applications assigned a "HIGH" attention level, a semi-transparent blue block to applications assigned a "Medium" attention level, a semi-transparent gray block to applications assigned a "Low" attention level, and a transparent block to applications assigned a "None" attention level. The semi-transparent blocks may appear to resemble highlighting of the corresponding application block and/or attention level identifier block. As another example, dots of various colors could be assigned to application blocks and/or attention level identifier blocks as privacy level identifiers. Any suitable color combinations also may be utilized.

The privacy attention map 400 and/or privacy level identifiers may be displayed on a display device such as display 224 of client device 220. In this manner, developers and/or other decision makers may quickly and easily identify those applications that have the highest privacy vulnerability possibilities, and that may benefit from more attention and resources directed to their privacy risks. In some implementations, a privacy attention map 400 may be generated for an application prior to commencing with product development. In some implementations, the privacy attention map 400 for an application may be updated periodically (e.g., annually) and/or updated for each new version of the application. In some implementations, the privacy attention score for an application may be considered a static privacy risk reference score for the application.

As noted above, privacy risk assessment device 300 also may determine, for each of a plurality of applications, an aggregated privacy assessment score 256 from a plurality of privacy risk scores that are based on second privacy risk information. In the example of FIG. 3, the machine-readable storage medium 320 may include privacy risk assessment instructions 340 comprising privacy risk identification instructions 344, privacy risk information instructions 348, and privacy risk analysis instructions 352. In some implementations, privacy risk identification instructions 344 may function to automatically identify privacy risks in an application based on an analysis of application code. In some implementations, when privacy risk identification instructions 344 are executed by processor 310, privacy risk identification instructions 344 may cause processor 310 and/or another processor to perform data flow scanning and/or code scanning to identify the privacy risks. For example, data flow scanning may identify data flows in the application that match certain predetermined data flows, such as flows that require the entry of credit card information. As another example, code scanning may perform an automatic review of the code to identify parameters that include phrases relevant to privacy, such as "password," "username," and the like and may verify, based on privacy rules accessible by the system, that the code is treating the identified parameters in a secure manner, such as by encrypting the parameters, cleaning the parameters after each use, and the like.

Privacy risk information instructions 348 may function to obtain second privacy risk information related to each of a plurality of privacy risks. In some implementations, when privacy risk information instructions 348 are executed by processor 310 and/or another processor, privacy risk information instructions 348 may cause the generation of a privacy assessment questionnaire and may receive a response to the privacy assessment questionnaire, where the response comprises the second privacy risk information. For example, privacy risk information instructions 348, when executed, may cause the generation of a privacy assessment questionnaire, cause the display of the privacy assessment questionnaire on a display device, such as display 224 of client device 220, cause the capturing of the responses to the privacy questionnaire, and cause the transmitting of the responses to another device, such as privacy assessment device 300.

In some implementations, the privacy risk questionnaire may include questions relating to a number of different types of privacy segments, such as questions relating to at least two of privacy impact (e.g., the potential impact on the business offering the software, such as potential penalties and reputational damage), data sensitivity type (e.g., the sensitivity of the data at risk, such as healthcare information, financial information, username information, opinions, pictures, etc.), nature of deployment (e.g., the type of application deployment, such as a mobile deployment, a cloud deployment, an on-premise deployment, etc.), compensating controls (e.g., the extent to which controls to compensate for the privacy risk is in place, such as encryption, security controls, audit logs, etc.), discovery skills (e.g., the skills and effort potentially required to exploit the privacy risk, such as technical hacking knowledge, physical access, etc.), and correlation impact (e.g., the extent to which the risk may be exploited by other privacy or security risks).

In some implementations, the privacy assessment questionnaire may include a number of pre-populated questions and pre-populated responses from which a user may select (e.g., via radio button, drop down menu, checkbox, etc.) to provide second privacy risk information to privacy risk assessment device 300. Thus, in some implementations, the second privacy risk information may include the selected pre-populated responses to the question, a numerical value associated with the selected pre-populated responses, and/or any other suitable information. For example, the second privacy risk information may include information responsive to the questions on the privacy assessment questionnaire, such as privacy impact information (e.g., information responsive to questions related to the privacy impact segment), data sensitivity type information (e.g., information responsive to questions related to the data sensitivity type segment), nature of deployment information (e.g., information responsive to questions related to the data sensitivity type segment), compensating controls information (e.g., information responsive to questions related to the compensating controls segment), discovery skills information (e.g., information responsive to questions related to the discovery skills segment), and correlation impact information (e.g., information responsive to questions related to the correlation impact segment).

Privacy risk analysis instructions 352 may function to assess a severity of each of the privacy risks based on an analysis of the second privacy risk information. In some implementations, when privacy risk analysis instructions 352 are executed by processor 310, the instructions may cause the processor to determine, for each of the privacy risks, a risk impact and a risk likelihood.

In some implementations, the risk impact and the risk likelihood may be determined by a plurality of privacy risk scores (e.g. numerical values) assigned by privacy risk assessment device 300. For example, privacy risk information instructions 348, when executed by a processor, may assign, for each of the privacy risks, a privacy impact score, a data sensitivity type score, a nature of deployment score, a compensating controls score, a discovery skills score, and/or a correlation impact score. For example the privacy impact score may be based on the privacy impact information, the data sensitivity type score may be based on the data sensitivity type information, the nature of deployment score may be based on the nature of deployment information, the compensating controls score may be based on the compensating controls information, the discovery skills score may be based on the discovery skills information, and the correlation impact score may be based on the correlation impact information. In some implementations, responses to questions that demonstrate a greater likelihood of risk impact may be assigned larger numerical values. For example, if the privacy impact information for a first privacy risk includes information that indicates that the first privacy risk may result in high reputational damage, it may be assigned a higher privacy impact score (e.g., "1") than a second privacy risk which may result in moderate reputational damage (e.g., "0.5").

In some implementations, the risk impact and the risk likelihood may be based on the privacy impact score, the data sensitivity type score, the nature of deployment score, the compensating controls score, the discovery skills score, and/or the correlation impact score. For example, the risk impact may be based on the privacy impact score and the data type sensitivity score, and the risk likelihood may be based on the nature of deployment score, the compensating controls score, and the discovery skills score. In some implementations, each of the privacy impact score, the data type sensitivity score, the nature of deployment score, and the compensating controls score may be assigned a different weighting factor. For example, to determine the risk impact, the privacy impact score (P) may be multiplied by a weighting factor (e.g., 4), the data type score (DT) may be multiplied by another weighting factor (e.g., 6), and both can be added together (e.g., 4P+6DT). As another example, to determine the risk likelihood, the nature of deployment score (D) may be multiplied by a weighting factor (e.g., 6), the compensating controls score (CC) may be multiplied by another weighting factor (e.g., 2), and the discovery skills score (S) may be multiplied by yet another weighting factor (e.g., 2). These weighted scores may be added together (6D+2CC+2S) and multiplied by another weighing factor (e.g., 0.1) to determine the risk likelihood. While in these examples there are a number of different types of weighting factors, various weighting factors may be used.

In some implementations, privacy risk analysis instructions 352 may function to categorize each of the privacy risks based on the assessed severity. For example, privacy risk analysis instructions 352, when executed, may assign a privacy risk score based on the risk impact and the risk likelihood, and may categorize each of the privacy risks based on the privacy risk score. In some implementations, the privacy risk score may be assigned by multiplying the risk impact, the risk likelihood, and the correlation impact score (CI) (e.g., CI×[(4P+6DT)(6D+2CC+2S)×0.1]).

In some implementations, the privacy risks may be categorized based on the privacy risk score falling within certain privacy risk ranges. For example, if the privacy risk score is less than 1.5, the particular privacy risk may be categorized as "low," if the privacy risk score is greater than or equal to 1.5 and less than 4.5, the particular privacy risk may be categorized as "medium," if the privacy risk score is greater than or equal to 4.5 and less than 7.5, the particular privacy risk may be categorized as "high", and privacy scores equal to or greater than 7.5 may be categorized as "urgent." While in this example particular ranges were identified as corresponding to "low," "medium," "high," and "urgent," various other ranges as well as categorizes may be utilized consistent with the disclosure.

In some implementations, the privacy risk analysis instructions 352 may function to determine, for an application, an aggregated privacy assessment score from a plurality of privacy risk scores that are based on the second privacy risk information. For example, each privacy risk identified in the application may be assigned a privacy risk score as described above. Based on the privacy risk score, each privacy risk may be categorized as described above (e.g., "low," "medium," "high," "urgent"). Each category may be assigned a different weight (e.g., "low"=5; "medium"=10; "high"=25; "urgent"=100). The number of privacy risks in each category may be determined. In some implementations, the aggregated privacy assessment score for an application may be determined by multiplying the number of privacy risks in each category by the category weight and a corresponding multiplier (e.g., 0.1, 0.2, 0.3, 0.4), and summing the totals in each category (e.g., Aggregated Privacy Assessment Score=0.4*[(Number of Urgent Risks)*100]+0.3*[(Number of High Risks)*25]+0.2* [(Number of Medium Risks)*10]+0.1*[(Number of Low Risks)*5]). In some implementations, the aggregated privacy assessment score may range between 0 and a maximum value (e.g., 100), with a lower number representing a lower probability of privacy breach exploitation, and a higher number representing a higher probability of privacy breach exploitation.

In some implementations, the determination of an aggregated privacy assessment score 256 for an application may be automatically triggered when the privacy attention score 252 for the application exceeds a predetermined threshold. For example, the privacy risk management instructions 324 may function to determine that a privacy attention score for an application exceeds a predetermined threshold such as, for example, 10. With reference to the example of FIG. 4 described above, an application having a privacy attention level of greater than 10 is assigned a privacy attention level identifier 410 of "Low," "Medium," or "HIGH." In each of these three categories, the corresponding proposed action 420 includes executing a privacy impact analysis for the application. In some implementations, executing a privacy impact analysis comprises determining an aggregated privacy assessment score for the application. Accordingly, and based on determining that the privacy attention score for an application exceeds the predetermined threshold, the privacy risk management instructions 324 may function to automatically determine the aggregated privacy assessment score for the application.

In some implementations, the privacy risk management instructions 324, when executed by processor 310, may cause a graphical element representing a combination of the privacy attention score 252 and the aggregated privacy assessment score 256 for an application to be displayed via a display device, such as display 224 of client device 220. In some examples and as noted above, privacy attention scores and aggregated privacy assessment scores may be determined for a plurality of applications. A corresponding plurality of graphical elements representing combinations of the privacy attention scores and the aggregated privacy assessment scores for the corresponding applications also may be generated and displayed via a display device.

Figure 5:
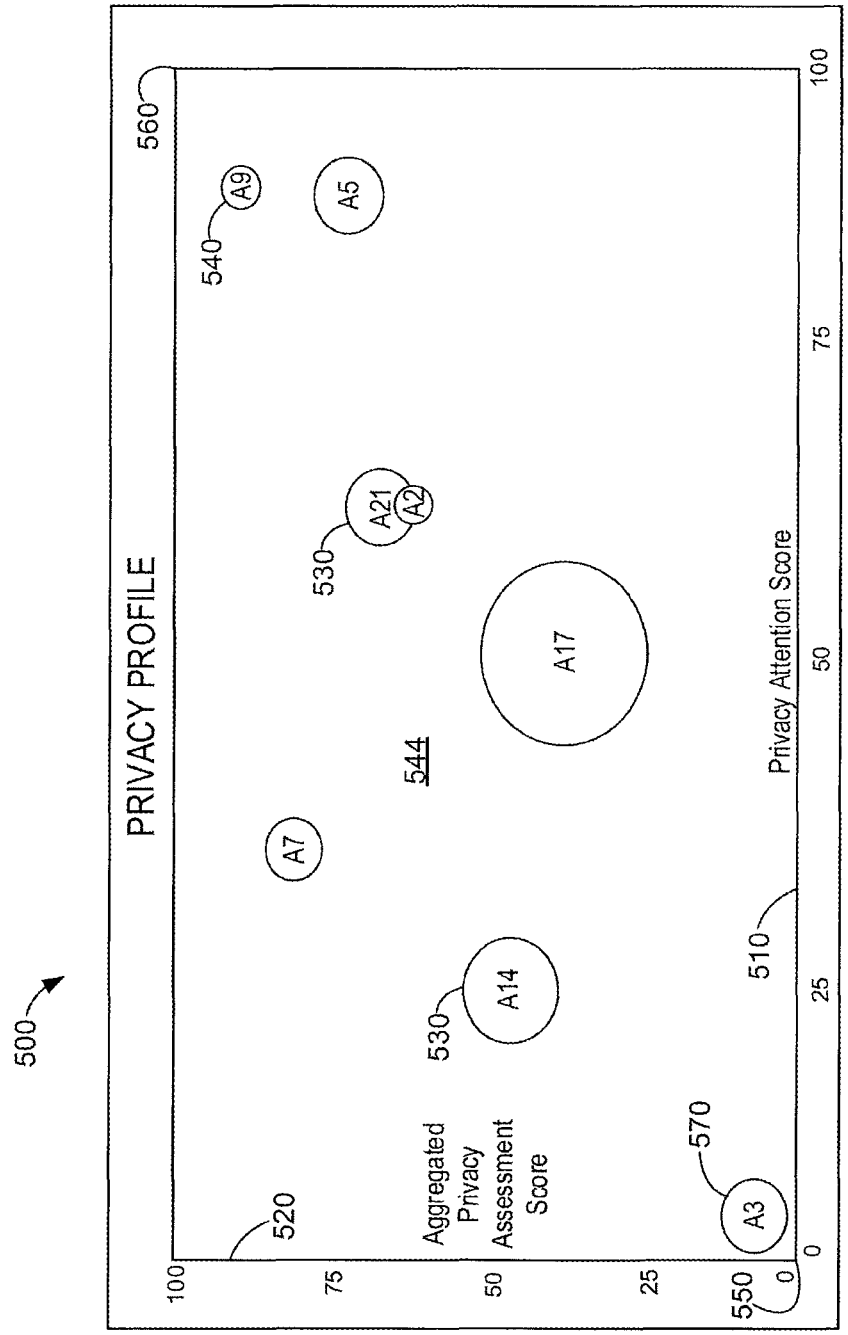
FIG. 5 is an illustration of an example privacy profile consistent with examples of the present disclosure.

In some implementations and with reference now to the example of FIG. 5, the privacy risk management instructions 324 may function to display via a display device a privacy profile 500 that comprises graphical elements corresponding to each of the applications. A location in the privacy profile 500 of each of the graphical elements indicates the privacy attention score and the aggregated privacy assessment score for the corresponding application. In some implementations a privacy profile 500 may comprise a chart having an X-axis 510 corresponding to the privacy attention score and a Y-axis 520 corresponding to the aggregated privacy assessment score.

In the example of FIG. 5, a graphical element may comprise a circle that is positioned within the privacy profile 500 at a location that corresponds to the combination of the privacy attention score and the aggregated privacy assessment score for an application. For example, an application A14 may have a privacy attention score of 25 and an aggregated privacy assessment score of 49. Accordingly, the application A14 may be indicated by graphical element 530 that is located at an X-axis location of 25 and Y-axis location of 49. Another application A9 may have a privacy attention score of 89 and an aggregated privacy assessment score of 91. Accordingly, the application A14 may be indicated by graphical element 540 that is located at an X-axis location of 89 and Y-axis location of 91. Additional graphical elements corresponding to additional applications may be similarly located in the privacy profile 500 according to their respective privacy attention scores and aggregated privacy assessment scores. In examples, the graphical elements may take any other suitable shapes or forms, such as squares, triangles, starts, etc.

In some implementations, a graphical element may comprise a visual indication of a magnitude of the revenue estimate for the corresponding application. As noted above, in some implementations the first privacy risk information may comprise an estimated revenue amount that the corresponding application may be expected to generate. In the example of FIG. 5, a visual indication of a magnitude of the revenue estimate for the corresponding application may be represented by a size of the circle identifying the application. For example, an application A14 may have an expected revenue of $500,000,000, while the application A9 may have an expected revenue of $250,000,000. Accordingly, the size of the graphical representation 530 corresponding to application A14 may be twice as large as the size of the graphical representation 540 corresponding to application A9. Additional graphical elements corresponding to additional applications may be similarly sized according to their respective expected revenues. In this manner and for each application shown in the privacy profile 500, the size of the application's graphical representation may clearly communicate the potential capital loss in case of privacy breach with respect to that application. Such information combined with the location of each graphical element in the chart may quickly communicate to decision makers the privacy status and exposure of each of a plurality of applications.

In some implementations, the privacy profile 500 may comprise a heat map that utilizes a color-coded background 544 on which the graphical representations are displayed. The background color may represent an overall privacy exposure that corresponds to the combination of a privacy attention score and an aggregated privacy assessment score. In some implementations, and to visually communicate an increasing overall privacy exposure diagonally from left to right in privacy profile 500, the color of background 544 may transition along a diagonal line extending from an origin 550 to a maximum point 560. For example, the color of background 544 may transition, from origin 550 to maximum point 560, from green to yellow to orange to red. Thus and for example, graphical representation 570 may be located over a generally green portion of background 544, graphical representation 530 may be located over a generally yellow portion of background 544, graphical representation 530 may be located over a generally orange portion of background 544, and graphical representation 540 may be located over a generally red portion of background 544.

In this manner, the privacy profile 500 may enable a decision maker to quickly assess an overall privacy exposure of individual applications, while also viewing the overall privacy exposure of a plurality of applications. In some implementations where the graphical elements also comprise a visual indication of a magnitude of the revenue estimate for the corresponding application, the privacy profile 500 provides a comprehensive view of privacy risk status along with the potential revenue at risk for each product. The privacy profile 500 also may allow a decision maker to view and follow privacy risk trends among a portfolio of applications.

Additionally and in some examples, decision makers and other stake holders involved in managing application information privacy may come from different disciplines, such as developers, attorneys, technical architects, business managers, etc. The privacy profile 500 may provide, for a portfolio of applications, a clear and comprehensive view of privacy exposure that may be readily understood by decision makers and other stake holders from a variety of disciplines.

Figure 6:
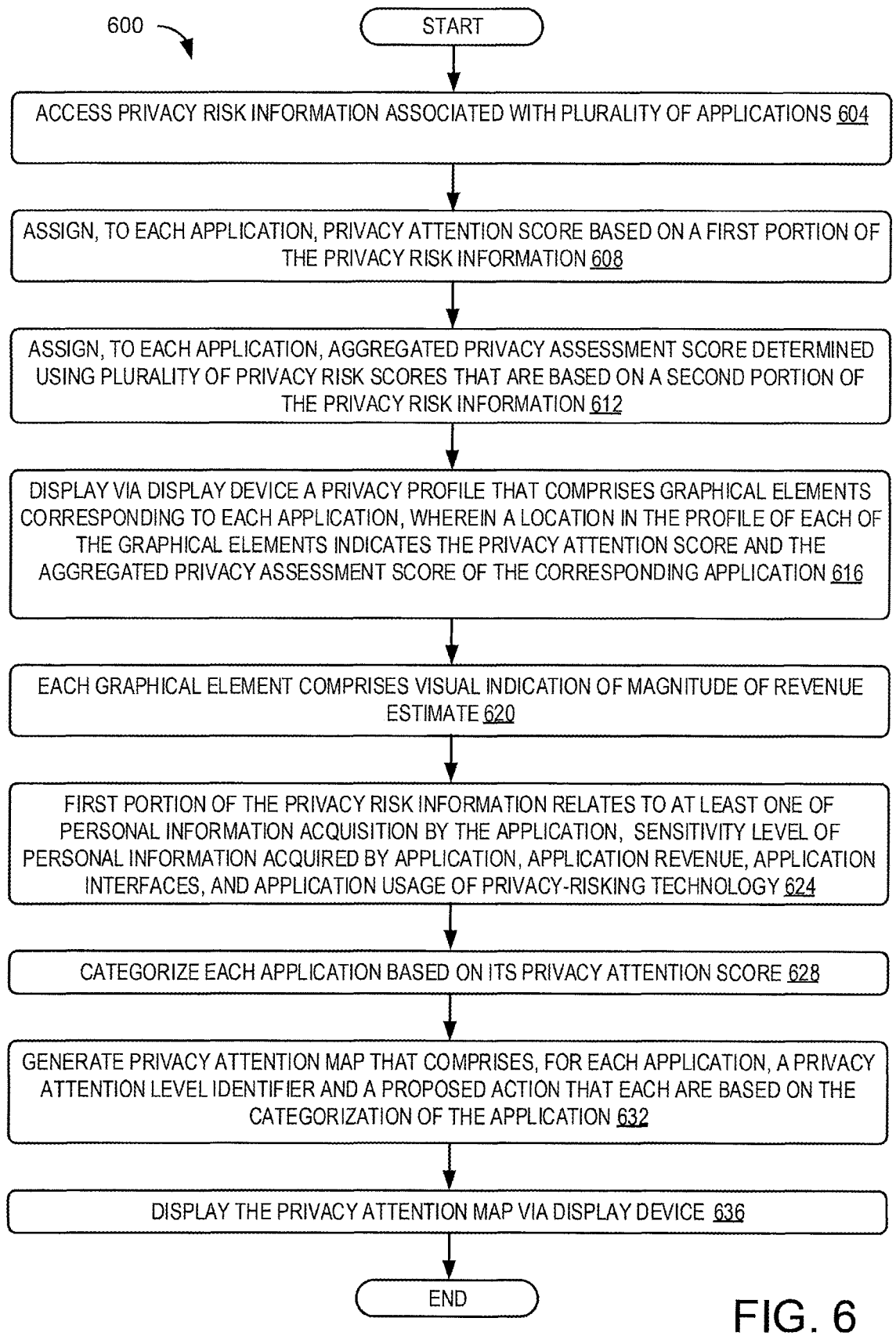
FIG. 6 is a flow chart of an example process for displaying a privacy profile consistent with examples of the present disclosure.

Turning now to FIG. 6, a flow chart of a method 600 for displaying a privacy profile according to implementations of the present disclosure is provided. The following description of method 600 is provided with reference to the software and hardware components described above and shown in FIGS. 1-5. For example, processes described below may be performed by computing device 10, privacy risk assessment device 210, privacy risk assessment device 300, or other suitable devices and/or systems. The method 600 may be executed in the form of instructions encoded on a non-transitory machine-readable storage medium that is executable by a processor and/or in the form of electronic circuitry. Method 600 may also be performed in other contexts using other suitable hardware and software components.

Method 600 may begin during application development and/or after an application has been developed. With reference to FIG. 6, at 604 the method 600 may include accessing privacy risk information associated with a plurality of applications. Accessing privacy risk information may be performed using, for example, methods described above such as privacy risk assessment device 210 receiving privacy risk information from client device 220 and/or storage 230 (e.g., privacy risk information is received based on the results of a privacy attention questionnaire and/or privacy assessment questionnaire, where the results are transmitted by client device 220 to privacy risk assessment device 210, where privacy risk assessment device 210 may cause the generation of the privacy attention questionnaire and/or privacy assessment questionnaire to capture the privacy risk information, and may cause the display of the privacy attention questionnaire and/or privacy assessment questionnaire on a display device, such as display 224 of client device 220). The privacy risk information may be received based on the use of a single privacy attention questionnaire for an entire application, or multiple privacy attention questionnaires. The privacy risk information also may be received based on the use of a single privacy assessment questionnaire for an entire application, or multiple privacy assessment questionnaires (e.g., a separate questionnaire for each identified privacy risk).

At 608 method 600 may include assigning, to each of the plurality of applications, a privacy attention score based on a first portion of the privacy risk information. Assigning the privacy attention score may be comprise, for example, privacy risk assessment device 210 determining a privacy attention score using results received from a privacy attention questionnaire as described above, where such results comprise the first portion of the privacy risk information. At 612 method 600 may include assigning, to each of the plurality of applications, an aggregated privacy assessment score determined using a plurality of privacy risk scores, wherein the privacy risk scores are based on a second portion of the privacy risk information. The aggregated privacy assessment score may represent a privacy risk severity and may be based on a risk impact and a risk likelihood. For example, the aggregated privacy assessment score may be determined using the methods described above (e.g., privacy risk assessment device 210 may determine the risk impact and the risk likelihood, where the risk impact may be based on a privacy impact score and a data type sensitivity score and the risk likelihood may be based on a nature of deployment score, a compensating controls score, and a discovery skills score).

At 616 method 600 may include displaying via a display device a privacy profile that comprises graphical elements corresponding to each of the applications, wherein a location in the privacy profile of each of the graphical elements indicates the privacy attention score and the aggregated privacy assessment score for the corresponding application. For example, privacy risk assessment device 210 may execute instructions to display privacy profile 500 via display 224 of client device 220. At 620 each of the graphical elements may comprise a visual indication of a magnitude of a revenue estimate for the application. At 624 method 600 may include wherein the first portion of the privacy risk information relates to least one of personal information acquisition by the application, sensitivity level of personal information acquired by the application, application revenue, application interfaces and application usage of privacy-risking technology.

At 628 method 600 may include categorizing each of the applications based on its privacy attention score. For example, privacy risk assessment device 210 may execute instructions to compare the privacy attention scores of the applications to various ranges to categorize each application as having a privacy attention level identifier of "None," "Low," "Medium," or "HIGH." At 632 method 600 may generate a privacy attention map that comprises, for each of the applications, its privacy attention level identifier and a proposed action that each are based on the categorization of the application. At 636 method 600 may display via the display device the privacy attention map. For example, privacy risk assessment device 210 may execute instructions to display privacy attention map 400 via display 224 of client device 220.

Method 600 is provided by way of example and is not meant to be limiting. Therefore, method 600 may include additional and/or other elements than those illustrated in FIG. 6. Further, method 600 may be performed in any suitable order. Further still, at least one element may be omitted from method 600 without departing from the scope of this disclosure.

Figure 7:
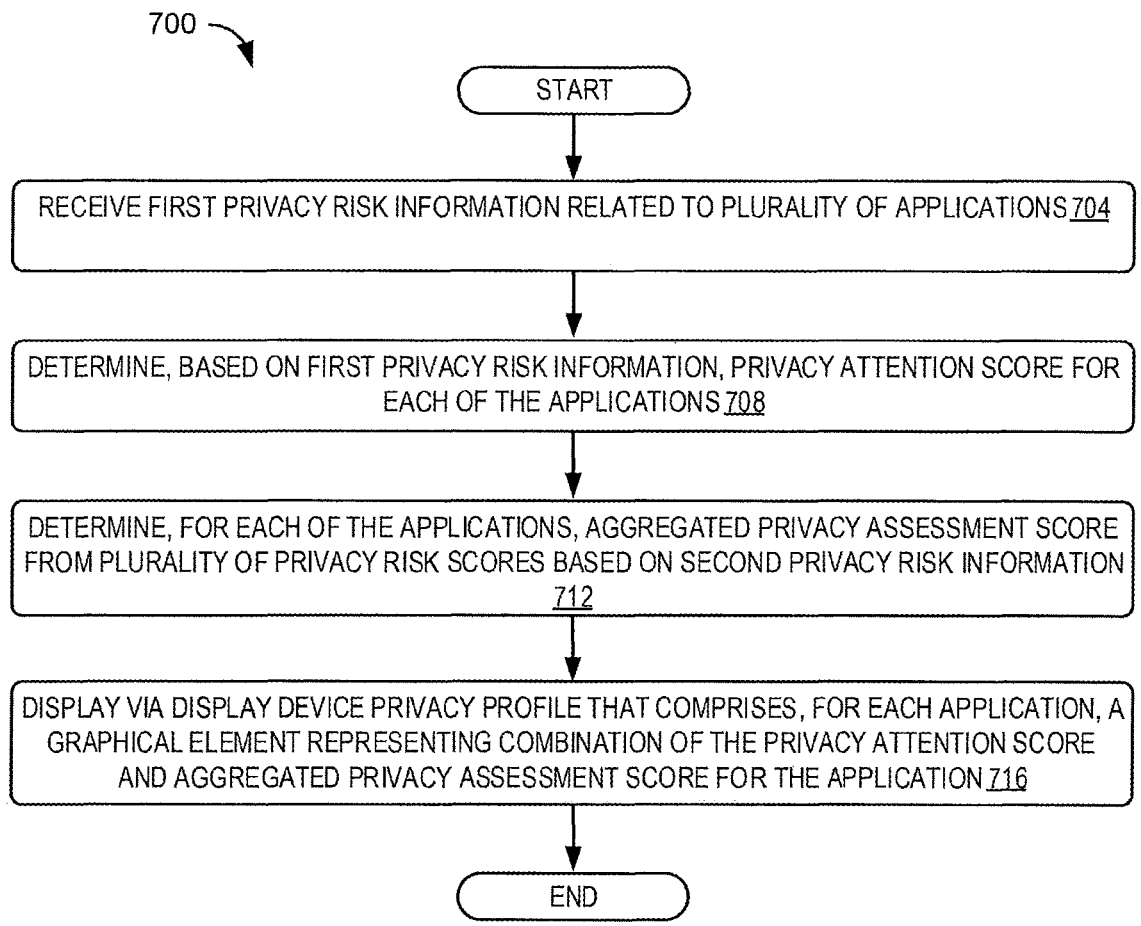
FIG. 7 is a flow chart of an example process for displaying a privacy profile consistent with examples of the present disclosure.

Turning now to FIG. 7, a flow chart of a method 700 for displaying a privacy profile according to implementations of the present disclosure is provided. The following description of method 700 is provided with reference to the software and hardware components described above and shown in FIGS. 1-5. For example, processes described below may be performed by computing device 10, privacy risk assessment device 210, privacy risk assessment device 300, or other suitable devices and/or systems. The method 700 may be executed in the form of instructions encoded on a non-transitory machine-readable storage medium that is executable by a processor and/or in the form of electronic circuitry. Method 700 also may be performed in other contexts using other suitable hardware and software components.

Method 700 may begin during application development and/or after an application has been developed. With reference to FIG. 7, at 704 the method 700 may include receiving first privacy risk information related to a plurality of applications. Receiving first privacy risk information may be performed using, for example, methods described above such as privacy risk assessment device 210 receiving first privacy risk information 244 from client device 220 and/or storage 230 (e.g., first privacy risk information is received based on the results of a privacy attention questionnaire, where the results are transmitted by client device 220 to privacy risk assessment device 210, where privacy risk assessment device 210 may cause the generation of the privacy attention questionnaire to capture the first privacy risk information, and may cause the display of the privacy attention questionnaire on a display device, such as display 224 of client device 220).

At 708 method 700 may include determining, based on the first privacy risk information, a privacy attention score for each of the applications. Determining the privacy attention score may comprise, for example, privacy risk assessment device 210 determining a privacy attention score using results received from a privacy attention questionnaire as described above, where such results comprise a first portion of the privacy risk information. At 712 method 700 may include determining, for each of the applications, an aggregated privacy assessment score from a plurality of privacy risk scores that are based on second privacy risk information. The second privacy risk information may comprise the results of a privacy assessment questionnaire, where the results are transmitted by client device 220 to privacy risk assessment device 210, where privacy risk assessment device 210 may cause the generation of the privacy assessment questionnaire to capture the second privacy risk information, and may cause the display of the privacy assessment questionnaire on a display device, such as display 224 of client device 220.

The aggregated privacy assessment score may represent a privacy risk severity and may be based on a risk impact and a risk likelihood. For example, an aggregated privacy assessment score may be determined using the methods described above (e.g., privacy risk assessment device 210 may determine the risk impact and the risk likelihood, where the risk impact may be based on a privacy impact score and a data type sensitivity score and the risk likelihood may be based on a nature of deployment score, a compensating controls score, and a discovery skills score).

At 716 method 700 may include displaying via a display device a privacy profile that comprises, for each of the applications, a graphical element representing a combination of the privacy attention score and the aggregated privacy assessment score for the application. For example, privacy risk assessment device 210 may execute instructions to display privacy profile 500 via display 224 of client device 220.

Method 700 is provided by way of example and is not meant to be limiting. Therefore, method 700 may include additional and/or other elements than those illustrated in FIG. 7. Further, method 700 may be performed in any suitable order. Further still, at least one element may be omitted from method 700 without departing from the scope of this disclosure.

The invention claimed is:
1. A computing device, comprising:
a storage; and
a processor coupled to the storage to:
determine, for an application, a privacy attention score based on first privacy risk information;
determine, for the application, an aggregated privacy assessment score from a plurality of privacy risk scores that are based on second privacy risk information; and
cause a privacy profile comprising a graphical element representing a combination of the privacy attention score and the aggregated privacy assessment score to be displayed via a display device, wherein a location of the graphical element in the privacy profile indicates the privacy attention score and the aggregated privacy assessment score.

2. The computing device of claim 1, the processor to:
determine that the privacy attention score exceeds a predetermined threshold; and
based on determining that the privacy attention score exceeds the predetermined threshold, determine the aggregated privacy assessment score.

3. The computing device of claim 1, wherein the first privacy risk information comprises a revenue estimate for the application.

4. The computing device of claim 3, wherein the graphical element comprises a visual indication of a magnitude of the revenue estimate.

5. The computing device of claim 1, the processor to:
determine, for a plurality of other applications, corresponding privacy attention scores based on corresponding first privacy risk information;
determine, for the plurality of other applications, corresponding aggregated privacy assessment scores based on corresponding second privacy risk information; and
generate the privacy profile comprising the graphical element and other graphical elements representing combinations of the corresponding privacy attention scores and the corresponding aggregated privacy assessment scores of the other applications.

6. The computing device of claim 5, the processor to:
for each of the application and the plurality of other applications, categorize the application based on its privacy attention score;
generate a privacy attention map that comprises, for each of the application and the plurality of other applications, a privacy attention level identifier and a proposed action that each are based on the categorization of the application; and
cause to display the privacy attention map via the display device.

7. The computing device of claim 1, the processor to:
cause generation of a privacy attention questionnaire; and
receive a response to the privacy attention questionnaire, the response comprising the first privacy risk information.

8. The computing device of claim 7, wherein the privacy attention questionnaire comprises questions relating to at least one of personal information acquisition by the application, sensitivity level of personal information acquired by the application, application revenue, application interfaces, and application usage of privacy-risking technology.

9. The computing device of claim 8, wherein each of the questions of the privacy attention questionnaire is assigned a weighting value that corresponds to a risk level and is used to determine the privacy attention score.

10. The computing device of claim 1, the processor to:
cause generation of a privacy assessment questionnaire; and
receive a response to the privacy assessment questionnaire, the response comprising the second privacy risk information.

11. A method, comprising:
accessing privacy risk information associated with a plurality of applications;
assigning, to each of the plurality of applications, a privacy attention score based on a first portion of the privacy risk information;
assigning, to each of the plurality of applications, an aggregated privacy assessment score determined using a plurality of privacy risk scores, wherein the privacy risk scores are based on a second portion of the privacy risk information; and
causing to display, via a display device, a privacy profile that comprises graphical elements corresponding to each of the applications, wherein a location in the privacy profile of each of the graphical elements indicates the privacy attention score and the aggregated privacy assessment score for the corresponding application.

12. The method of claim 11, wherein each of the graphical elements comprises a visual indication of a magnitude of a revenue estimate.

13. The method of claim 11, wherein, for each of the plurality of applications, the first portion of the privacy risk information relates to least one of personal information acquisition by the application, sensitivity level of personal information acquired by the application, application revenue, application interfaces, and application usage of privacy-risking technology.

14. The method of claim 11, further comprising:
categorizing each of the applications based on its privacy attention score;
generating a privacy attention map that comprises, for each of the applications, a privacy attention level identifier and a proposed action that each are based on the categorization of the application; and
causing to display, via the display device the privacy attention map.

15. A non-transitory machine-readable storage medium encoded with instructions which, when executed by a processor, cause the processor to:
receive first privacy risk information related to a plurality of applications;
determine, based on the first privacy risk information, a privacy attention score for each of the applications;
determine, for each of the applications, an aggregated privacy assessment score from a plurality of privacy risk scores that are based on second privacy risk information; and
cause to display, via a display device a privacy profile that comprises, for each of the applications, a graphical element representing a combination of the privacy attention score and the aggregated privacy assessment score for the application, wherein a location in the privacy profile of each of the graphical elements indicates the privacy attention score and the aggregated privacy assessment score for the corresponding application.

16. The non-transitory machine-readable storage medium of claim 15, wherein the graphical element for each of the applications comprises a visual indication of a revenue estimate for the application.

17. The non-transitory machine-readable storage medium of claim 15, wherein the instructions cause the processor to:
cause generation of a privacy attention questionnaire; and
receive a response to the privacy attention questionnaire, the response comprising the first privacy risk information related to a first application of the plurality of applications.

18. The non-transitory machine-readable storage medium of claim 17, wherein the privacy attention questionnaire comprises questions relating to at least one of personal information acquisition by the first application, sensitivity level of personal information acquired by the first application, revenue of the first application, interfaces in the first application, and usage of privacy-risking technology in the first application.

19. The non-transitory machine-readable storage medium of claim 18, wherein each of the questions of the privacy attention questionnaire is assigned a weighting value that corresponds to a risk level and is used to determine the privacy attention score.

20. The non-transitory machine-readable storage medium of claim 15, wherein the instructions cause the processor to:
   categorize each of the applications based on its privacy attention score;
   generate a privacy attention map that comprises, for each of the applications, a privacy attention level identifier and a proposed action that each are based on the categorization of the application; and
   cause to display the privacy attention map via the display device.

* * * * *